(12) United States Patent  (10) Patent No.: US 8,225,358 B2
Nagano  (45) Date of Patent: Jul. 17, 2012

(54) CONTENT RECOMMENDATION APPARATUS AND METHOD

(75) Inventor: Satoshi Nagano, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 550 days.

(21) Appl. No.: 12/362,779

(22) Filed: Jan. 30, 2009

(65) Prior Publication Data

US 2009/0222857 A1   Sep. 3, 2009

(30) Foreign Application Priority Data

Feb. 28, 2008   (JP) .................................. 2008-048304

(51) Int. Cl.
   *H04N 7/173* (2006.01)
   *H04N 5/445* (2006.01)
   *G06F 3/00* (2006.01)
   *G06F 13/00* (2006.01)

(52) U.S. Cl. .............................. 725/87; 725/38; 725/100

(58) Field of Classification Search ........................ None
   See application file for complete search history.

(56) References Cited

U.S. PATENT DOCUMENTS

| 7,623,502 | B2 * | 11/2009 | Wassingbo et al. ........... 370/338 |
| 7,779,011 | B2 * | 8/2010 | Venkataraman et al. ..... 707/742 |
| 2002/0078448 | A1 * | 6/2002 | Wakahara ........................ 725/39 |
| 2004/0105030 | A1 * | 6/2004 | Yamane ........................ 348/460 |
| 2004/0221308 | A1 * | 11/2004 | Cuttner et al. ................... 725/46 |
| 2006/0088276 | A1 * | 4/2006 | Cho et al. ......................... 386/46 |
| 2007/0094292 | A1 | 4/2007 | Kataoka |

FOREIGN PATENT DOCUMENTS

| JP | 2007-124465 | 5/2007 |
| JP | 2007-142761 | 6/2007 |

* cited by examiner

*Primary Examiner* — Mark D Featherstone

(74) *Attorney, Agent, or Firm* — Brundidge & Stanger, P.C.

(57) ABSTRACT

A content recommendation apparatus that can recommend contents suitable to user's taste immediately even after introduction of the system even if a TV set is used by unspecified users. Among previously-determined recommendation ranks of contents, the content recommendation apparatus of the present invention lowers the recommendation rank of a VOD content that is similar to TV programs broadcast in other media at a prescribed time. As the prescribed time, can be employed a time designated by a user, a time on a prescribed cycle, or a time when a TV program on the air in another media is changed, for example.

9 Claims, 14 Drawing Sheets

FIG. 3

CONTENT INFORMATION STORAGE PART 26

| CONTENT ID | GENRE | | | | DIRECTOR | | | PERFORMERS | | | | COUNTRY | | | | FREE WORDS | | | | | PRELIMINARY RANK |
|---|---|---|---|---|---|---|---|---|---|---|---|---|---|---|---|---|---|---|---|---|---|
| | DRAMA | MOVIE | ANIMATION | ... | DIRECTOR A | DIRECTOR B | DIRECTOR C | ACTOR A | ACTOR B | VOICE ACTOR C | ... | JAPAN | US | KOREA | ... | HISTORY | SCIENCE | COOKING | POLITICS | ... | |
| V001 | 1 | 0 | 0 | ... | 0 | 1 | 0 | 1 | 1 | 0 | ... | 0 | 1 | 0 | ... | 1 | 0 | 0 | 0 | ... | 1 |
| V002 | 0 | 0 | 1 | ... | 1 | 0 | 0 | 0 | 0 | 1 | ... | 1 | 0 | 0 | ... | 0 | 1 | 0 | 0 | ... | 2 |
| V003 | 0 | 1 | 0 | ... | 0 | 1 | 0 | 0 | 1 | 0 | ... | 1 | 0 | 0 | ... | 1 | 0 | 0 | 0 | ... | 3 |
| ... | ... | ... | ... | ... | ... | ... | ... | ... | ... | ... | ... | ... | ... | ... | ... | ... | ... | ... | ... | ... | ... |

FIG. 4

| CONTENT ID | GENRE | | | DIRECTOR | | | ... | PERFORMERS | | | ... | COUNTRY | | | ... | TOTAL |
|---|---|---|---|---|---|---|---|---|---|---|---|---|---|---|---|---|
| | DRAMA | MOVIE | ANIMATION | ... | DIRECTOR A | DIRECTOR B | DIRECTOR C | ... | ACTOR A | ACTOR B | VOICE ACTOR C | ... | JAPAN | US | KOREA | ... | |
| V001 | 1 | 0 | 0 | ... | 0 | 1 | 0 | ... | 1 | 1 | 0 | ... | 0 | 1 | ... | ... | |
| C103 | 0 | 1 | 0 | ... | 0 | 1 | 0 | ... | 0 | 1 | 0 | ... | 0 | 1 | 0 | ... | |
| COINCIDENT ITEM | 0 | 0 | 0 | ... | 0 | 1 | 0 | ... | 0 | 1 | 0 | ... | 0 | 1 | 0 | ... | 23 |

40 — V001
41 — C103

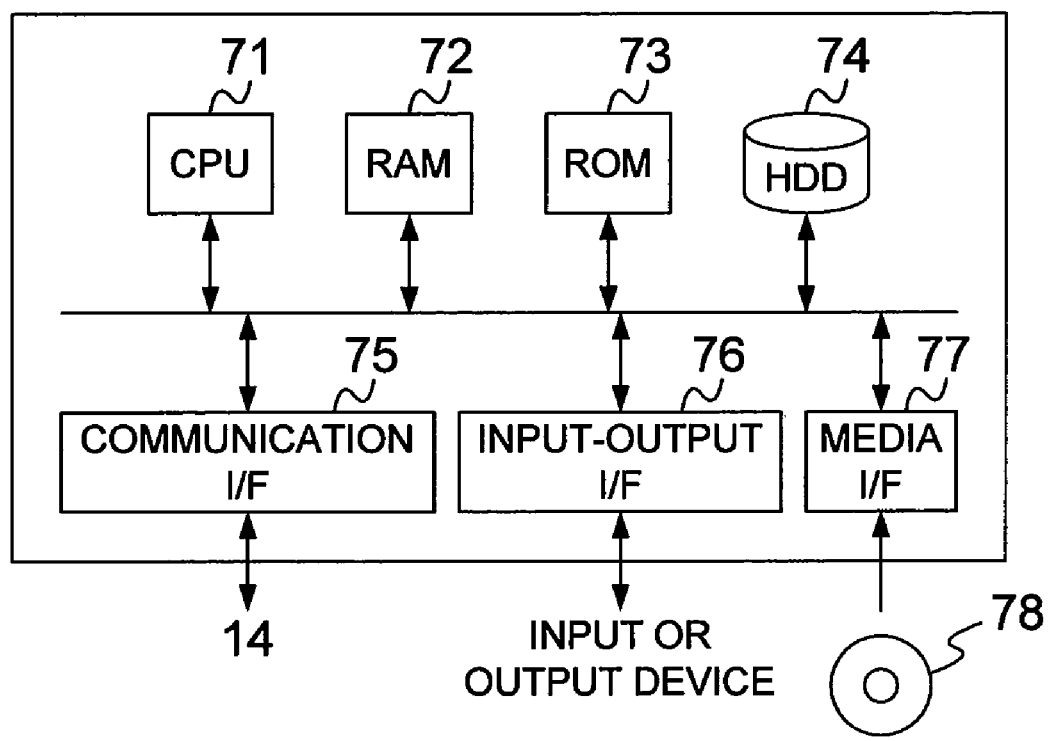

CONTENT RECOMMENDATION APPARATUS AND METHOD

BACKGROUND OF THE INVENTION

The present invention relates to a technique of recommending Video On Demand (VOD) contents, which are distributed under a VOD system, to a user.

Japanese Patent Application Laid-Open No. 2007-142761 (hereinafter, referred to as Patent Document 1) discloses a system in which the recording history is collected for each user, the collected recording history is used to analyze the preference of the user, and the result of analysis is used to recommend VOD contents suitable to user's taste.

SUMMARY OF THE INVENTION

It will be convenient for a user if he can receive recommendation of VOD contents just after his introduction of a viewing system for viewing VOD contents. However, according to the technique disclosed in Patent Document 1, good recommendation can not be provided to a user if a certain amount of his recording history has not been collected. Thus, a user can not receive recommendation of VOD contents for a while even if he introduces a viewing system for VOD contents.

Further, in the technique disclosed in Patent Document 1, a user is specified for each TV set. Thus, there is a problem that suitable recommendation can not be given if there is not one-to-one correspondence between a TV set and a viewer such as the case where a TV set is provided in each room of a hotel or where members of a family view contents through one TV set.

The present invention has been made considering the above situation. And, an object of the present invention is to recommend contents that meet taste of a user immediately after introduction of a system even in the case where a TV set is used by unspecified users.

To solve the above problems, the content recommendation apparatus of the present invention lowers a recommendation rank of a VOD content that is similar to TV programs broadcast in other media at a prescribed time, among previously-determined recommendation ranks of contents.

For example, a first mode of the present invention provides a content recommendation apparatus that recommends to a user VOD contents distributed under a VOD system, comprising: a content information storage unit, which stores meta data of each VOD content and a preliminary rank which indicates a preliminary recommendation rank assigned previously to that VOD content; a TV program acquisition unit, which acquires meta data of each TV program that is broadcast at a given point of time; a similarity calculation unit, which calculates a degree of similarity of each VOD content to TV programs broadcast at a given point of time by referring to the content information storage unit when the meta data concerned is acquired by the TV program acquisition unit; a recommendation rank correction unit, which calculates a rank change quantity of each VOD content on basis of the degree of similarity calculated by the similarity calculation unit, the rank change quantity becoming a larger value as the degree of similarity becomes higher, to correct the preliminary rank of each VOD content by lowering the preliminary rank by the calculated rank change quantity; and a recommendation information providing unit, which provides recommendation information that includes the corrected preliminary ranks to the user.

Further, a second mode of the present invention provides a content recommendation method for a content recommendation apparatus that recommends to a user VOD contents distributed under a Video On Demand (VOD) system, wherein: the content recommendation apparatus performs: a TV program acquisition step, in which meta data of each TV program that is broadcast at a given point of time is acquired; a similarity calculation step, in which, when the meta data of TV program is acquired in the TV program acquisition step, a degree of similarity of each VOD content to TV programs broadcast at a given point of time is calculated by referring to a content information storage unit that stores the meta data of the VOD content and a preliminary rank which indicates a preliminary recommendation rank assigned to the VOD content; a recommendation rank correction step, in which a rank change quantity of each VOD content is calculated on a basis of the degree of similarity calculated in the similarity calculation step, the rank change quantity becoming a larger value as the degree of similarity becomes higher, and the preliminary rank of each VOD content is corrected by lowering the preliminary rank by the calculated rank change quantity; and a recommendation information providing step, in which recommendation information that includes the corrected preliminary ranks is provided to the user.

According to the content recommendation apparatus of the present invention, it is possible to recommend contents suitable to user's taste immediately after introduction of the system even if a TV set is used by unspecified users.

BRIEF DESCRIPTION OF THE DRAWINGS

FIG. 3 is a diagram showing an example of a structure of data stored in a content information storage part;

FIG. 4 is a conceptual diagram for explaining a process of calculating a degree of similarity;

FIG. 14 is a hardware configuration diagram showing an example of a hardware configuration of a computer that implements functions of a content recommendation apparatus.

DESCRIPTION OF THE PREFERRED EMBODIMENTS

To begin with, a first embodiment of the present invention will be described.

Figure 1:
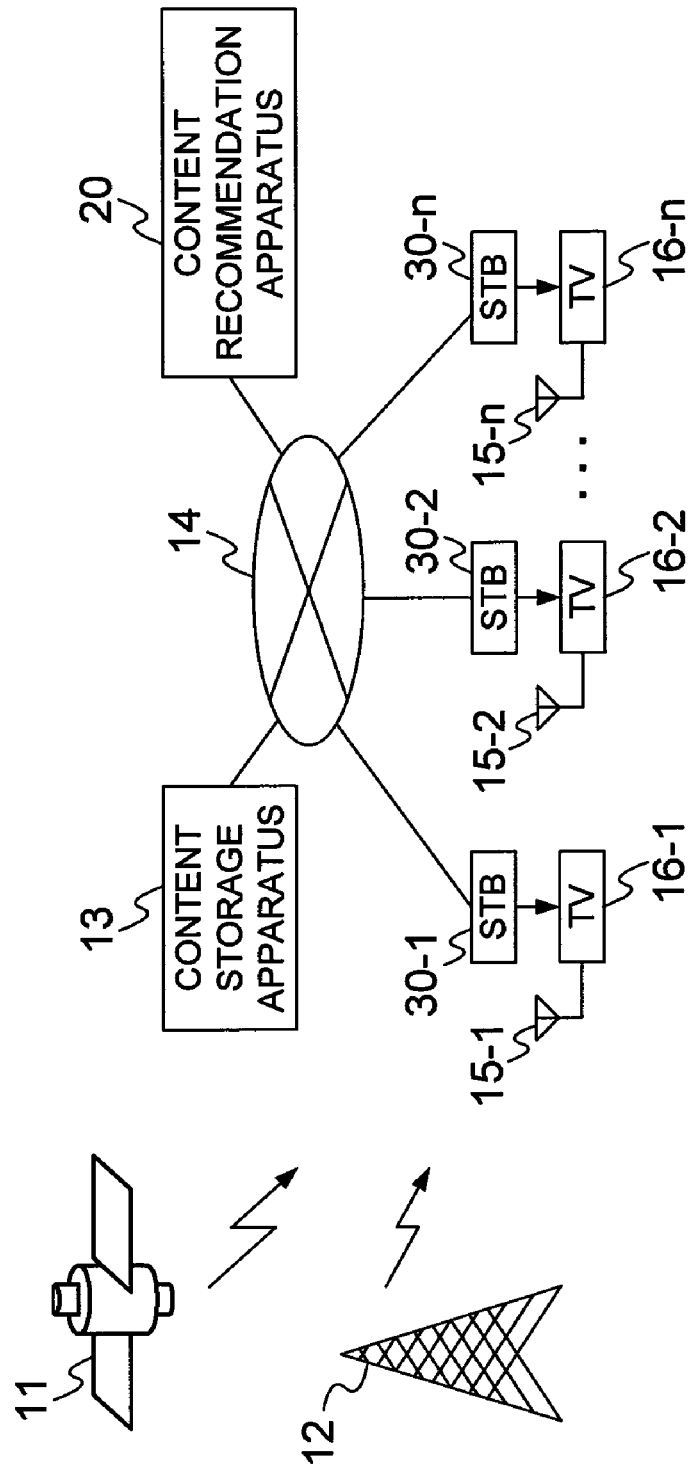
FIG. 1 is a system configuration diagram showing an example of a configuration of a viewing system of a first embodiment of the present invention.

FIG. 1 is a system configuration diagram showing an example of a configuration of a viewing system 10 according to the first embodiment. The viewing system 10 includes a content storage apparatus 13, a content recommendation apparatus 20, a plurality of Set Top Boxes (STB) 30, and a plurality of TV sets 16. The content storage apparatus 13, the content recommendation apparatus 20 and the STBs are coupled with one another through a communication line 14 such as the Internet.

Each STB 30 is placed, for example, in a home of a user, a room of a hotel, or the like, and coupled with a TV set 16. Each TV set 16 can receive programs broadcast in real time through a satellite 11, programs broadcast in real time through an Terrestrial relay station 12, and programs broadcast in real time through the communication line 14 and the STB 30. Each TV set 16 receives and outputs a program selected by a user.

Further, each STB 30 acquires a VOD content, which is requested by a user through an input device such as a remote control, from the content storage apparatus 13 through the communication line 14, and outputs the acquired VOD content to the TV set 16.

Further, when a user requests an STB 30 to recommend a VOD content through the input device, the STB 30 sends a recommendation request including the current time as a designated time to the content recommendation apparatus 20 through the communication line 14. Then, the STB 30 receives recommendation information, which includes the recommendation ranks of VOD contents, from the content recommendation apparatus 20. And, the STB 30 displays on the TV set 16 the information on the recommendation of the VOD contents in the order of recommendation rank included in the received recommendation information, starting from the most-recommended content.

The content storage apparatus 13 stores a plurality of VOD contents beforehand. When a VOD content is requested from an STB 30 through the communication line 14, the content storage apparatus 13 provides the requested VOD content to the STB 30.

When the content recommendation apparatus 20 receives a recommendation request (which includes a designated time) for VOD contents through the communication line 14, the content recommendation apparatus 20 calculates degrees of similarity of each VOD content to programs broadcast in real time at the designated time in other media. Then, the content recommendation apparatus 20 corrects preliminarily-set recommendation rank, by lowering more the preliminary recommendation rank of a VOD content that has the higher degree of similarity. Then, the content recommendation apparatus 20 generates recommendation information that includes the corrected recommendation ranks, and sends through the communication line 14 the generated recommendation information to the STB 30 that has sent the request for recommendation of VOD contents.

Figure 2:
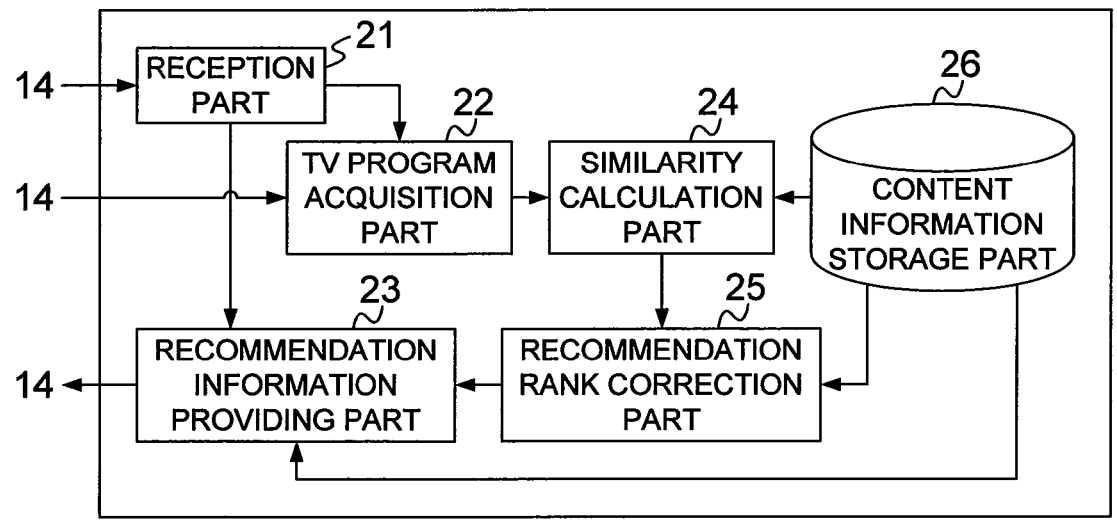
FIG. 2 is a block diagram showing an example of a functional configuration of a content recommendation apparatus in the first embodiment.

FIG. 2 is a block diagram showing an example of a functional configuration of the content recommendation apparatus 20 in the first embodiment. The content recommendation apparatus 20 includes a reception part 21, a TV program acquisition part 22, a recommendation information providing part 23, a similarity calculation part 24, a recommendation rank correction part 25, and a content information storage part 26.

As shown in FIG. 3 for example, the content information storage part 26 stores meta data 261 of a VOD content and a preliminary rank 262 previously set for the VOD content, for each content ID 260 that identifies a VOD content stored in the content storage apparatus 13.

The meta data 261 includes information such as a title, a subtitle, a part number, a genre, performers' names, a director's name, a production date, a country name, a comment on the program, and the like of the content in question. These pieces of information can be obtained from an Electronic Program Guide (EPG), for example. The preliminary rank 262 is set by a business entity or the like that provides VOD contents, depending on the situation such as popular topics of the time and release of new movies. Here, the meta data 261 also previously stores data such as a thumbnail of a still image or a moving image indicating an outline of the content.

When the reception part 21 receives a recommendation request of a VOD content, which includes a designated time, from an STB 30 through the communication line 14, the reception part 21 notifies the TV program acquisition part 22 of the designated time included in the received recommendation request. Further, the reception part 21 notifies the recommendation information providing part 23 of the identification information of the STB 30 that has sent the recommendation request.

When the TV program acquisition part 22 is notified of the designated time from the reception part 21, the TV program acquisition part 22 acquires meta data that indicates the property information of each TV program broadcast at the designated time, through the communication line 14, and sends the acquired meta data of TV program to the similarity calculation part 24. For example, the TV program acquisition part 22 acquires an EPG of programs broadcast by each broadcasting company from the website operated by that broadcasting company, and acquires meta data of each TV program from the acquired EPG.

As another mode, the TV program acquisition part 22 may receive an EPG that is broadcast in addition to a TV program through each medium (i.e. an electric wave or a dedicated network), to acquire meta data of each TV program from the received EPG.

Further, in the present embodiment, the TV program acquisition part 22 acquires meta data of each TV program broadcast through each medium at the designated time notified from the reception part 21. However, as another mode, the TV program acquisition part 22 may acquire meta data of each TV program that will be broadcast within a predetermined time ahead from the designated time notified from the reception part 21.

Here, for example, the predetermined time may be one hour, or an average replay time of the VOD contents stored in the content storage apparatus 13, or the shortest replay time among the replay times of the VOD contents stored in the content storage apparatus 13.

Returning to FIG. 2, the description will be continued. When the similarity calculation part 24 receives meta data of TV program from the TV program acquisition part 22, the similarity calculation part 24 selects meta data on one TV program from the received meta data of TV program, and selects one VOD content by referring to the content information storage part 26. Then, the similarity calculation part 24 compares selected meta data of TV program with the meta data of the selected VOD content, and counts the number of coincident items.

For example, as shown in FIG. 4, the similarity calculation part 24 compares the meta data of the selected TV program 41 and the meta data of the selected VOD content 40, and sums up the number of coincident items among items in which information is set. FIG. 4 shows an example in which the number of coincident items is 23 between the meta data of the selected TV program (the content ID: C103) and the meta data of the selected VOD content (the content ID: V001).

Then, the similarity calculation part 24 calculates a coincidence ratio i.e. a ratio of the number of coincident items to the total number of items. For example, assuming that the total number of items is 1000 in the example shown in FIG. 4, the coincidence ratio becomes 23/1000=2.3%.

The similarity calculation part 24 calculates a degree of similarity of the selected VOD content to the TV programs that are broadcast through the other media at the designated time, by summing up the coincident ratios of all TV programs corresponding to the meta data received from the TV program acquisition part 22. If the result of summing up of the coincident ratios exceeds 100%, the degree of similarity is considered to be 100%.

The similarity calculation part 24 calculates degrees of similarity of all VOD contents, and outputs the calculated degrees of similarity together with the content IDs of the corresponding VOD contents to the recommendation rank correction part 25.

When the recommendation rank correction part 25 receives a degree of similarity of each VOD content from the similarity calculation part 24, the recommendation rank correction part 25 calculates a rank change quantity, which indicates a change quantity of the preliminarily-set recommendation rank for each VOD content, by using the following equation (1) for example.

$$\text{Rank change quantity}=[k*\text{Degree of similarity}] \quad (1)$$

Here, [x] indicates the maximum integer that does not exceed x, and k is a predetermined constant (for example, 0.1).

Then, the recommendation rank correction part 25 acquires the preliminary rank of each VOD from the content information storage part 26, and corrects the acquired preliminary rank of each VOD by lowering it by the calculated change quantity. Then, the recommendation rank correction part 25 sends the corrected recommendation rank of each VOD content together with the content ID of the VOD content in question to the recommendation information providing part 23.

If a plurality of VOD contents have the same rank as a result of the correction of their preliminary ranks, the recommendation rank correction part 25 gives priority to the rank change of a VOD content whose rank change quantity is larger, and thus reduces the rank change quantity by one with respect to a VOD content whose rank change quantity is smaller (as a result, its rank will rise one step).

In many times, a user who wants to view a VOD content begins by checking programs that are broadcast in real time in the other media such as terrestrial digital broadcasting or satellite broadcasting, and views a VOD content if there is no TV program that meets his taste or interest among those TV programs. For such a user, it is highly possible that a VOD content having high degree of similarity to TV programs broadcast in other media is not a VOD content he wants to view.

The content recommendation apparatus 20 of the present embodiment can recommend a VOD content that meets the needs of a user more satisfactorily, since the higher the similarity of a VOD content to programs broadcast in other media is, the more the content recommendation apparatus 20 lowers the recommendation rank of the VOD content, for example, in VOD content recommendation ranking previously set by a business entity who provides VOD contents.

Further, the content recommendation apparatus 20 of the present embodiment does not prepare recommendation ranking customized to suit each user. Accordingly, the content recommendation apparatus 20 can recommend a VOD content that meets the needs of a user even if there is not one-to-one correspondence between a TV set and a viewer such as the case where a TV set is provided in each room of a hotel or where members of a family view contents through one TV set.

Further, the content recommendation apparatus 20 of the present embodiment does not require the viewing history or recording history of each user. Thus, a user can receive recommendation of VOD contents immediately after introduction of the viewing system 10 of the present embodiment.

When the recommendation information providing part 23 receives the corrected recommendation rank of each VOD content from the recommendation rank correction part 25, the recommendation information providing part 23 acquires the meta data of each VOD content from the content information storage part 26. Then, the recommendation information providing part 23 generates recommendation information that includes the corrected recommendation ranks and the meta data of a VOD content at each rank, and sends the generated recommendation information to the STB 30 corresponding to the identification information notified from the reception part 21, through the communication line 14.

Figure 5:
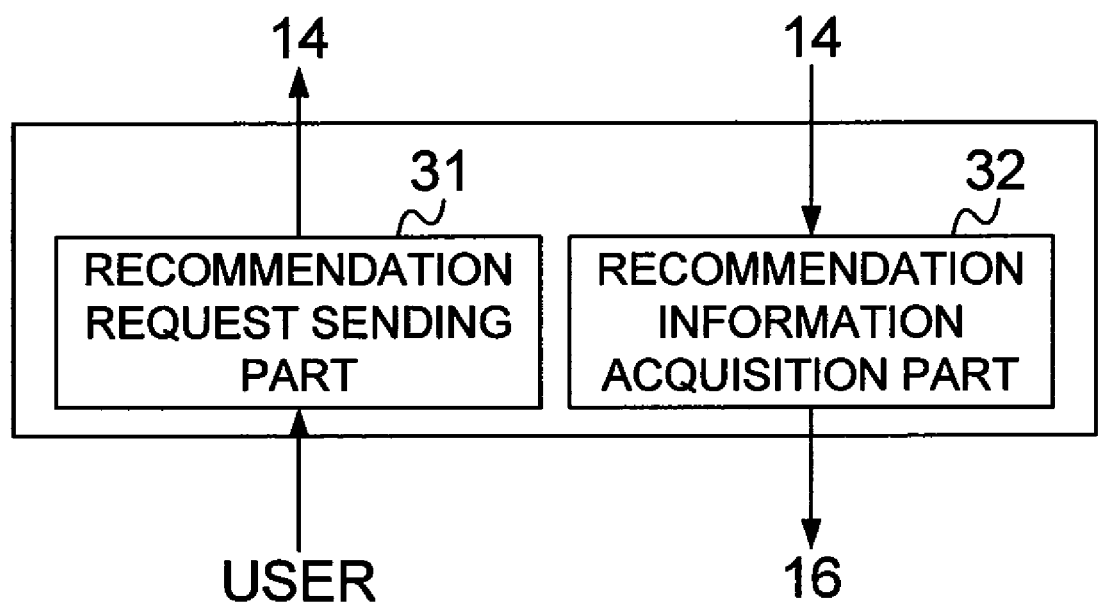
FIG. 5 is a block diagram showing an example of a functional configuration of an STB in the first embodiment.

FIG. 5 is a block diagram showing an example of a functional configuration of an STB 30 in the first embodiment. Each STB 30 includes a recommendation request sending part 31 and a recommendation information acquisition part 32.

When the recommendation request sending part 31 is demanded to recommend VOD contents by a user through an input device such as a remote control, the recommendation request sending part 31 generates a recommendation request having the current time as the designated time, and sends the generated recommendation request to the content recommendation apparatus 20 through the communication line 14.

Figure 6:
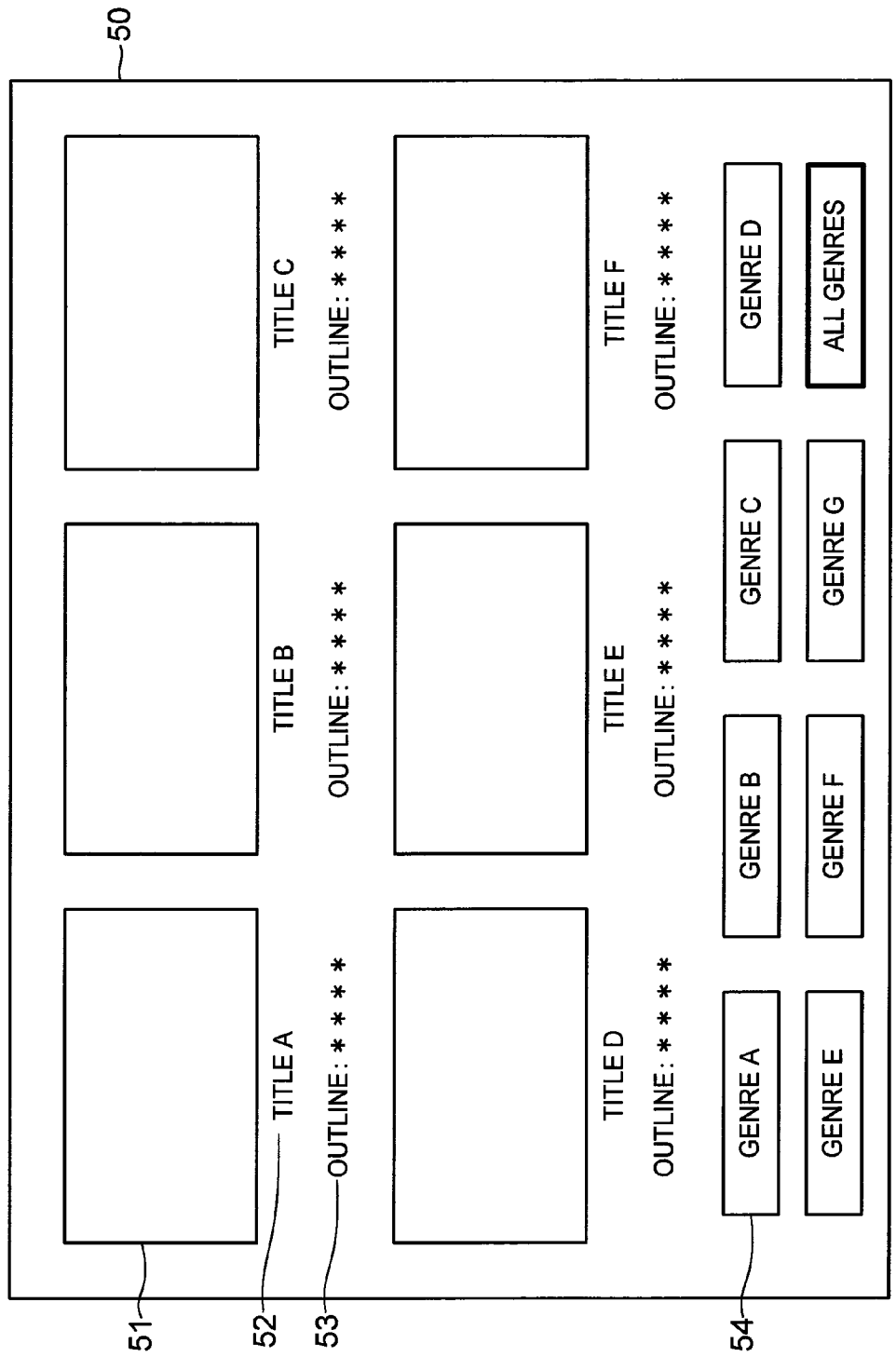
FIG. 6 is a conceptual view showing an example of a screen displayed on a TV set in the first embodiment.

When the recommendation information acquisition part 32 receives recommendation information from the content recommendation part 20 through the communication line 14, the recommendation information acquisition part 32 displays a part of the meta data of the corresponding VOD contents in the order of rank from highest recommendation rank included in the received recommendation information, for example as the image 50 shown in FIG. 6, on the screen of the TV set 16.

The image 50 displays an area 51 for displaying thumbnails of still images or moving images each indicating an outline of a VOD content, an area 52 for displaying titles of the VOD contents displayed in the area 51, an area 53 for displaying outlined information of the VOD contents displayed in the area 51, and the like. In the example shown in FIG. 6, the top six VOD contents are displayed. The higher the recommendation rank of a VOD content is, in the upper left the VOD content is displayed. And, the lower the recommendation rank of a VOD content, in the lower right the VOD content is displayed.

Further, the image 50 shown in FIG. 6 displays an area 54 for displaying buttons to use for designating a genre. When a user selects a button for designating a genre through the input device such as a remote control, the recommendation information acquisition part 32 displays, in the image 50, information on the top six VOD contents among the VOD contents corresponding to the genre designated by the selected button.

Figure 7:
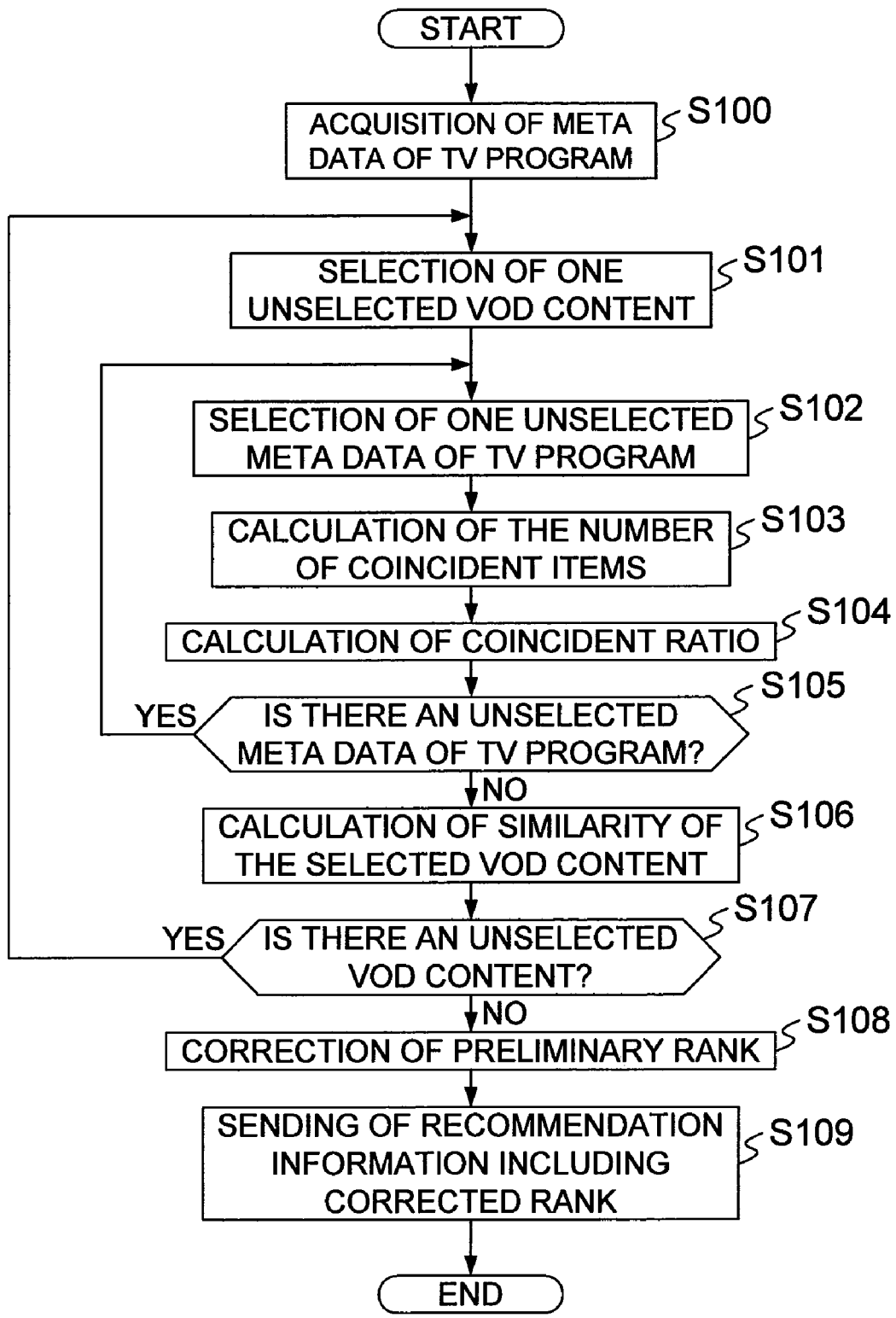
FIG. 7 is a flowchart showing an example of operation of the content recommendation apparatus in the first embodiment.

FIG. 7 is a flowchart showing an example of operation of the content recommendation apparatus 20 in the first embodiment. When the content recommendation apparatus 20 receives a recommendation request from an STB 30, the content recommendation apparatus 20 starts the operation shown in the flowchart.

First, the reception part 21 notifies the TV program acquisition part 22 of the designated time included in the received recommendation request, and notifies the recommendation information providing part 23 of the identification information of the STB 30 that has sent the recommendation request. Then, the TV program acquisition part 22 acquires through the communication line 14 the meta data of each TV program that is broadcast at the designated time notified from the reception part 21, and sends the acquired meta data to the similarity calculation part 24 (S100).

Next, the similarity calculation part 24 refers to the content information storage part 26 and selects one of unselected VOD contents (S101). Then, the similarity calculation part 24 selects one of unselected meta data among the meta data of TV program received from the TV program acquisition part 22 (S102).

Next, the similarity calculation part 24 compares the meta data of the VOD content selected in the step S101 with the meta data of the TV program selected in the step S102, and calculates the number of coincident items among items in which information is set (S103), and calculates the coincidence ratio by using the calculated number of items and the total number of the items (S104).

Next, the similarity calculation part 24 judges whether there is an unselected meta data among the meta data of TV program received from the TV program acquisition part 22 (S105). If there is an unselected meta data among the meta data of TV program received from the TV program acquisition part 22 (S105: Yes), then the similarity calculation part 24 carries out the processing shown in the step S102 again.

When all meta data of the TV programs has been selected in the meta data received from the TV program acquisition part 22 (S105: No), the similarity calculation part 24 calculates the degree of similarity of the VOD content selected in the step S101 by summing up calculated coincidence ratios (S106).

Next, the similarity calculation part 24 refers to the content information storage part 26 and judges whether there is an unselected VOD content (S107). If there is an unselected VOD content (S107: Yes), then the similarity calculation part 24 carries out the processing shown in the step S101 again.

When all the VOD contents have been selected (S107: No), the similarity calculation part 24 outputs the degree of similarity calculated for each VOD content together with the content ID of the VOD content in question to the recommendation rank correction part 25. The recommendation rank correction part 25 calculates the rank change quantity for each VOD content by using the above-mentioned equation (1), for example.

Next, the recommendation rank correction part 25 acquires the preliminary rank of each VOD content from the content information storage part 26, and corrects the preliminary rank of each VOD content by lowering it by the calculated rank change quantity (S108). Then, the recommendation rank correction part 25 sends the corrected recommendation rank of each VOD content together with the content ID of the VOD content in question to the recommendation information providing part 23.

Next, the recommendation information providing part 23 acquires the meta data of each VOD content from the content information storage part 26, and generates recommendation information that includes the corrected recommendation ranks and the meta data of a VOD content at each rank. And, the recommendation information providing part 23 sends through the communication line 14 the generated recommendation information to the STB 30 corresponding to the identification information notified from the reception part 21 (S109). Then, the content recommendation apparatus 20 ends the operation shown in the flowchart.

Hereinabove, the first embodiment of the present invention has been described.

As obvious from the above description, the content recommendation apparatus 20 of the present embodiment can recommend contents suitable to user's taste immediately after introduction of the system even if a TV set 16 is used by unspecified users.

Next, a second embodiment of the present invention will be described.

Figure 8:
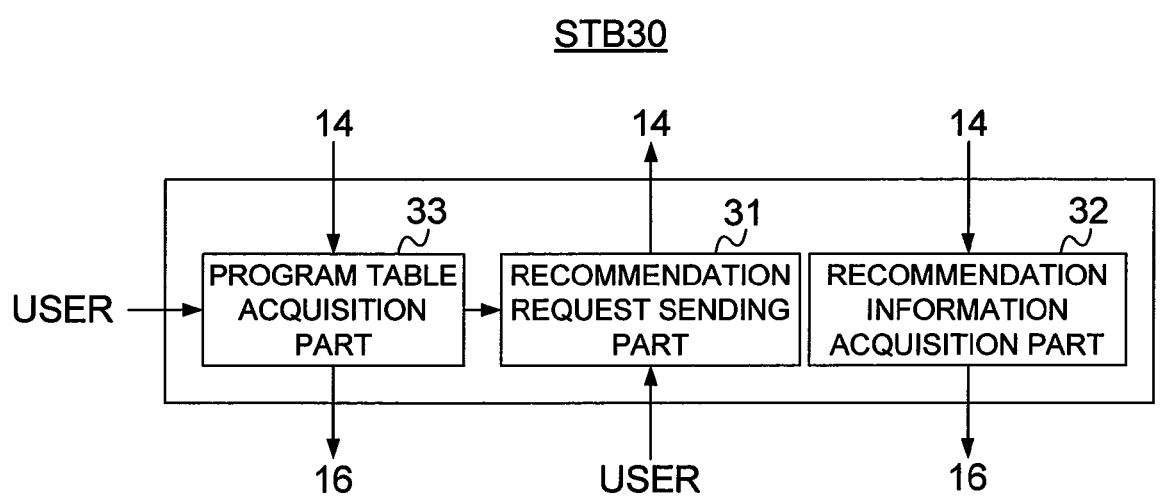
FIG. 8 is a block diagram showing an example of a functional configuration of an STB in a second embodiment.

FIG. 8 is a block diagram showing an example of a functional configuration of each STB 30 in the second embodiment. Each STB 30 includes a recommendation request sending part 31, a recommendation information acquisition part 32 and a program table acquisition part 33.

When a user demands display of EPG through an input device such as a remote control, the program table acquisition part 33 acquires an EPG from the website or the like of each broadcasting company through the communication line 14 and displays the acquired EPG on the TV set 16.

When a user selects a slot on the EPG through the input device such as the remote control, the recommendation request sending part 31 generates a recommendation request that has, as the designated time, the time at which the program shown in the selected slot will be broadcast. Then, the recommendation request sending part 31 sends the generated recommendation request to the content recommendation apparatus 20 through the communication line 14.

Figure 9:
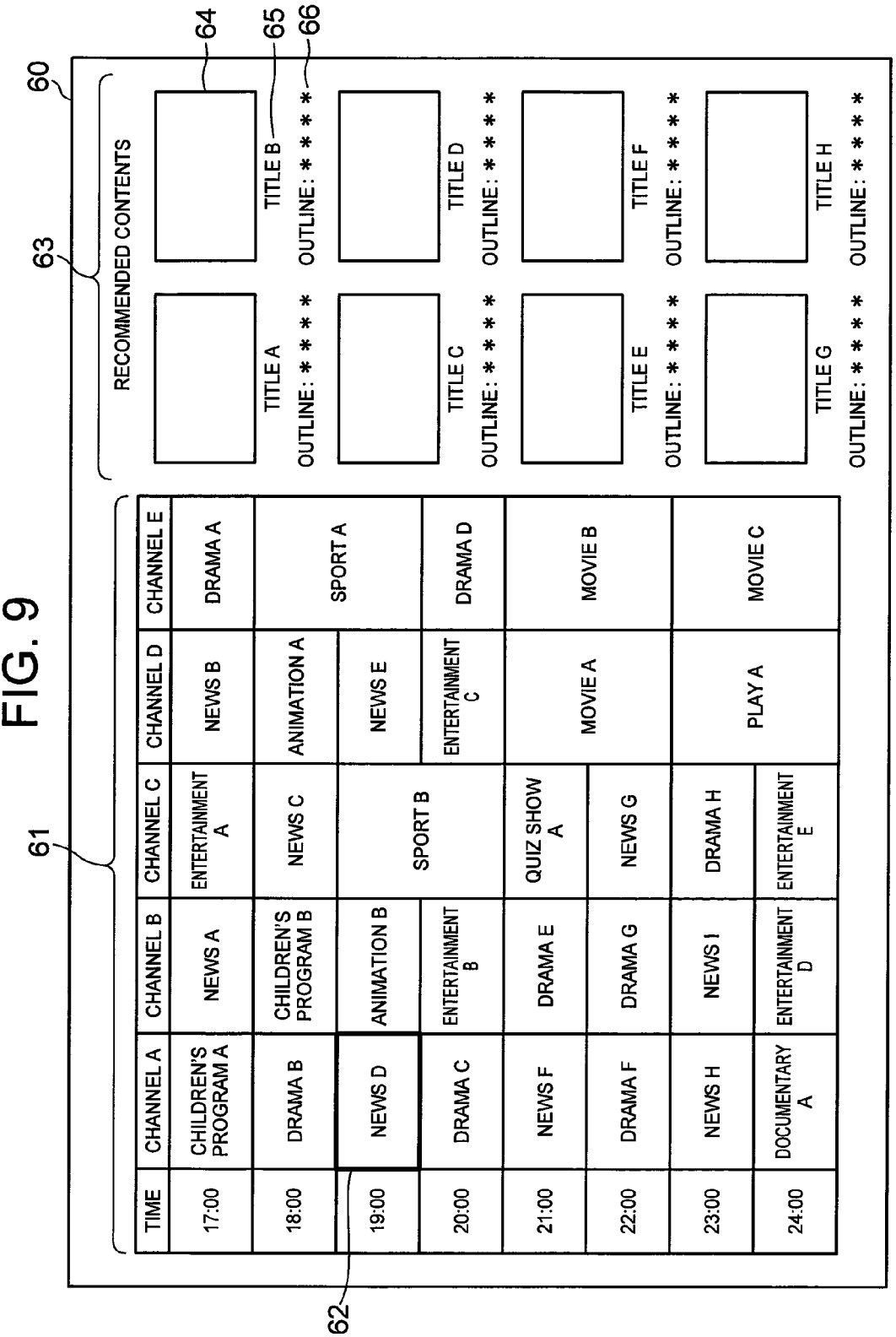
FIG. 9 is a conceptual view showing an example of a screen displayed on a TV set in the second embodiment.

When the recommendation information acquisition part 32 receives recommendation information from the content recommendation apparatus 20 through the communication line 14, the recommendation information acquisition part 32 displays the EPG and a part of the meta data of the corresponding VOD contents in the order of rank from highest recommendation rank included in the received recommendation information, for example as the image 60 shown in FIG. 9, on the screen of the TV set 16.

In the example shown in FIG. 9, the area 61 displays the EPG, and the area 63 displays information on the VOD contents recommended on the basis of the recommendation information. FIG. 9 displays a state where a user has selected, through the input device such as a remote control, "News program d" to be broadcast in the slot of the time zone "19:00" of "Channel A".

In this state, the recommendation request sending part 31 generates a recommendation request that has the time at which the selected "News program d" will be broadcast (for example, the program starting time), as the designated time. And, the recommendation request part 31 sends the generated recommendation request to the content recommendation apparatus 20. Then, the recommendation information acquisition part 32 displays a part of the meta data of VOD contents in the area 63, according to the recommendation ranks included in recommendation information received from the content recommendation apparatus 20.

The information on VOD contents displayed in the area 63 is information on VOD contents that have lower similarity to other media's programs broadcast in the slot designated on the EPG by the user. Thus, it is possible to provide more convenient information to a user by recommending VOD contents on the basis of recommendation ranking in which VODs of higher similarity to the other media's programs broadcast in the slot selected on the EPG by the user are lowered in rank.

In the present embodiment, the recommendation request sending part 31 generates a recommendation request that has, as the designated time, the time when the program in the selected slot will be broadcast (such as the program starting time), and sends the generated recommendation request to the content recommendation apparatus 20. As another mode, the recommendation request sending part 31 may make a recommendation request include the time zone in which the program in the selected slot will be broadcast, instead of the designated time. In that case, the TV program acquisition part 22 of the content recommendation apparatus 20 acquires the meta data of each program that will be broadcast in another medium in the time zone included in the recommendation request, and provides the acquired meta data to the similarity calculation part 24.

Hereinabove, the second embodiment of the present invention has been described.

Next, a third embodiment of the present invention will be described.

Figure 10:
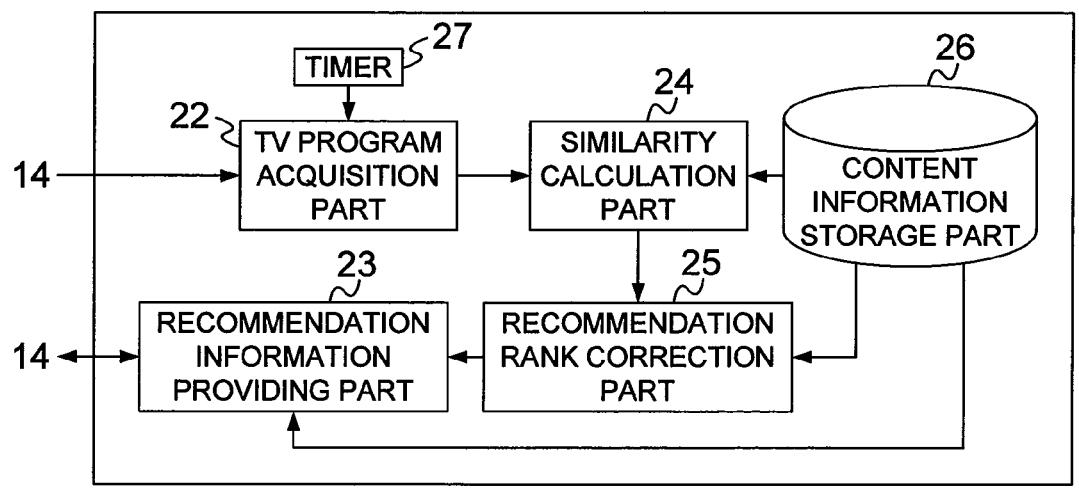
FIG. 10 is a block diagram showing an example of a functional configuration of a content recommendation apparatus in a third embodiment.

FIG. 10 is a block diagram showing an example of a functional configuration of a content recommendation apparatus 20 in the third embodiment. The content recommendation apparatus 20 includes a TV program acquisition part 22, a recommendation information providing part 23, a similarity calculation part 24, a recommendation rank correction part 25, a content information storage part 26 and a timer 27. In FIG. 10, a component having the same symbol as that in FIG. 2 has the same or similar function as that of the corresponding component in FIG. 2, except for the below-described points, and description of such components will be omitted.

At intervals of a prescribed time (for example, at intervals of one hour), the timer 27 instructs the TV program acquisition part 22 to acquire meta data of TV program. Receiving an instruction from the timer 27 to acquire meta data of TV program, the TV program acquisition part 22 acquires through the communication line 14 meta data of each TV program that is currently broadcasted in another medium, and sends the acquired meta data of TV program to the similarity calculation part 24.

Further, as another mode, it is possible that, when the timer 27 instructs the TV program acquisition part 22 to acquire meta data of TV program, the TV program acquisition part 22 acquires meta data of each TV program that will be broadcasted within a predetermined time ahead from the current time.

The recommendation information providing part 23 generates recommendation information that includes corrected recommendation ranks and the meta data of a VOD content at each rank, and retains the generated recommendation information until the next corrected recommendation ranks are received from the recommendation rank correction part 25. Further, when the recommendation information providing part 23 receives a recommendation request from an STB 30 through the communication line 14, the recommendation information providing part 23 sends the retained recommendation information to the STB 30.

Figure 11:
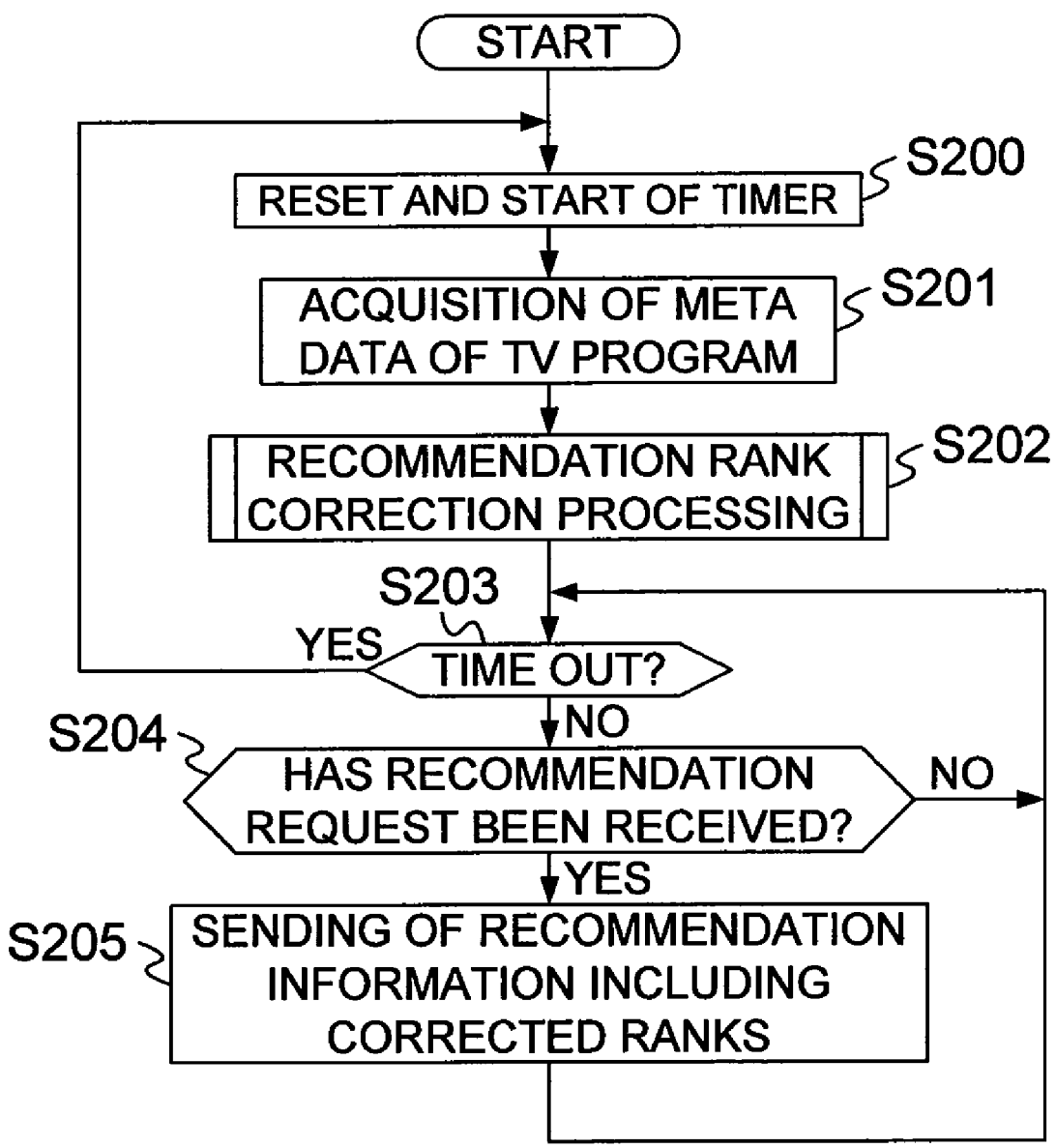
FIG. 11 is a flowchart showing an example of operation of the content recommendation apparatus in the third embodiment.

FIG. 11 is a flowchart showing an example of operation of the content recommendation apparatus 20 in the third embodiment. The content recommendation apparatus 20 starts the operation shown in the flowchart at a predetermined timing such as at turning-on of the power, for example.

First, the timer 27 is reset and started (S200), and instructs the TV program acquisition part 22 to acquire meta data of TV program. Then, the TV program acquisition part 22 acquires through the communication line 14 meta data of each TV program that is currently broadcast in another medium (S201). The TV program acquisition part 22 sends the acquired meta data to the similarity calculation part 24. Then, the similarity calculation part 24 and the recommendation rank correction part 25 carry out the steps S101 through S108 described referring to FIG. 7 (S202).

Next, the recommendation information providing part 23 generates recommendation information that includes the corrected ranks and the meta data of a VOD content at each rank, and retains the generated recommendation information until the next corrected recommendation ranks are received from the recommendation rank correction part 25. Then, the timer 27 judges whether time-out has occurred or not (S203). In the case where time-out has occurred (S203: Yes), the timer 27 carries out the processing shown in the step S200 again.

In the case where time-out has not occurred (S203: No), the recommendation information providing part 23 judges whether a recommendation request has been received from an STB 30 or not (S204). In the case where a recommendation request has not been received from an STB 30 (S204: No), the timer 27 carries out the processing shown in the step S203 again. In the case where a recommendation request has been received from an STB 30 (S204: Yes), the recommendation information providing part 23 sends the retained recommendation information to the STB 30 (S205), and the timer 27 carries out the processing shown in the step S203 again.

Hereinabove, the third embodiment of the present invention has been described.

Next, a fourth embodiment of the present invention will be described.

Figure 12:
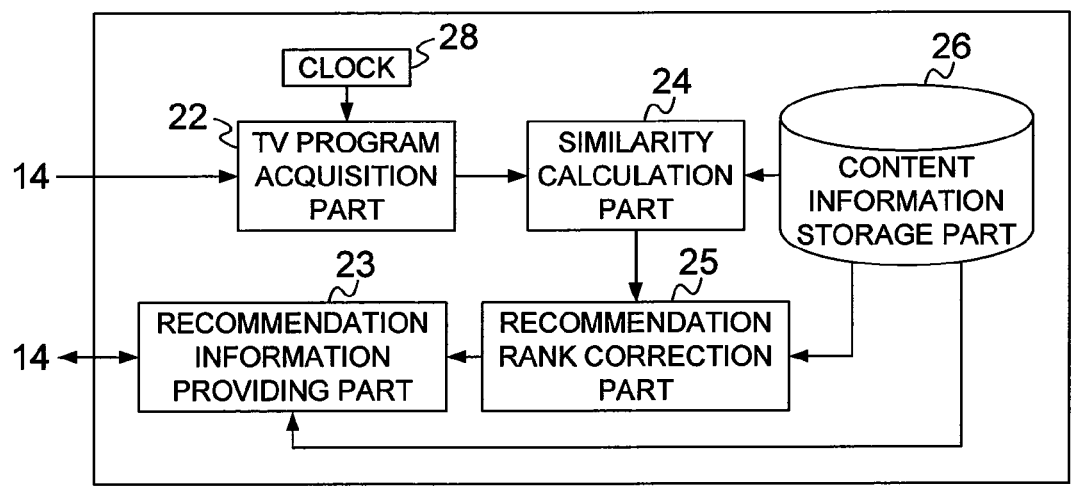
FIG. 12 is a block diagram showing an example of a functional configuration of a content recommendation apparatus in a fourth embodiment.

FIG. 12 is a block diagram showing an example of a functional configuration of a content recommendation apparatus 20 in the fourth embodiment. The content recommendation apparatus 20 includes a TV program acquisition part 22, a recommendation information providing part 23, a similarity calculation part 24, a recommendation rank correction part 25, a content information storage part 26, and a clock 28. In FIG. 12, a component having the same symbol as that in FIG. 2 has the same or similar function as that of the corresponding component in FIG. 2, except for the below-described points, and description of such components will be omitted.

The TV program acquisition part 22 acquires EPG of currently-broadcast TV programs from, for example, the websites operated by respective broadcasting companies, extracts meta data of the currently-broadcast TV programs from the acquired EPG, and sends the extracted meta data to the similarity calculation part 24. Further, referring to the acquired EPG and the time of the clock 28, the TV program acquisition part 22 judges whether any of the on-air TV programs has ended and broadcasting of another TV program has started.

In the case where any of the on-air TV programs has ended and broadcasting of another TV program has started, the TV program acquisition part 22 acquires EPG of currently-broadcast TV programs from, for example, the websites operated by respective broadcasting companies, extracts meta data of the currently-broadcast TV programs from the acquired EPG, and sends the extracted meta data to the similarity calculation part 24.

As another mode, in the case where any of the on-air TV programs has ended and broadcasting of another TV program has started, it is possible that the TV program acquisition part 22 acquires EPG of each TV program that will be broadcasted within a predetermined time ahead from the current time, extracts meta data from the acquired EPG, and sends the extracted meta data to the similarity calculation part 24.

The recommendation information providing part 23 generates recommendation information that includes the corrected ranks and the meta data of a VOD content at each rank, and retains the generated recommendation information until the next corrected recommendation ranks are received from the recommendation rank correction part 25. When a recommendation request is received from an STB 30 through the communication line 14, the recommendation information providing part 23 sends the retained recommendation information to the STB 30.

Figure 13:
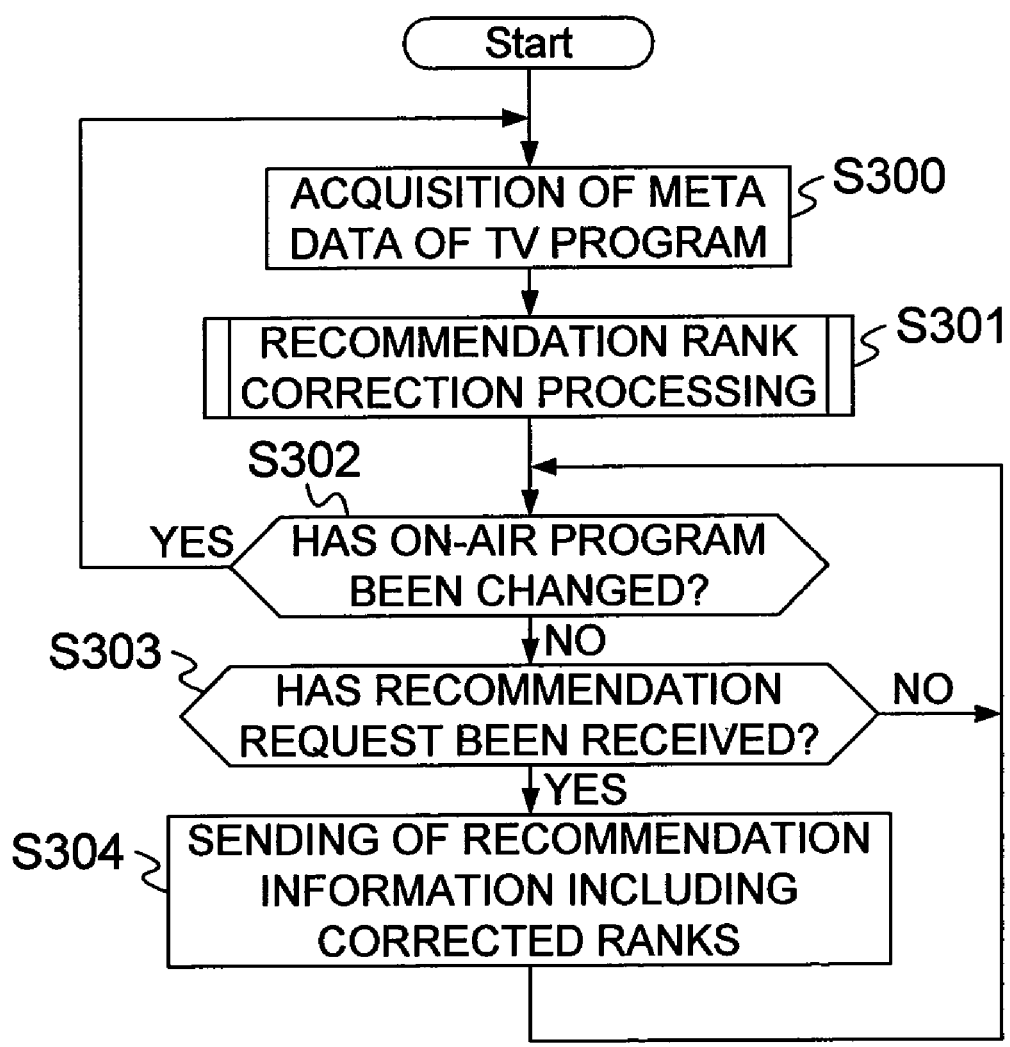
FIG. 13 is a flowchart showing an example of operation of the content recommendation apparatus in the fourth embodiment.

FIG. 13 is a flowchart showing an example of operation of the content recommendation apparatus 20 in the fourth embodiment. The content recommendation apparatus 20 starts the operation shown in the flowchart at a predetermined timing such as at turning-on of the power, for example.

First, the TV program acquisition part 22 acquires EPG of currently-broadcast TV programs from, for example, the websites operated by respective broadcasting companies (S300). Then, the TV program acquisition part 22 extracts meta data from the acquired EPG, and sends the extracted meta data to the similarity calculation part 24. Then, the similarity calculation part 24 and the recommendation correction part 25 carry out the steps S101 through S108 described referring to FIG. 7 (S301).

Next, the recommendation information providing part 23 generates recommendation information that includes the corrected ranks and the meta data of a VOD content at each rank, and retains the generated recommendation information until the next corrected recommendation ranks are received from the recommendation correction part 25. Then, referring to the acquired EPG and the time of the clock 28, the TV program acquisition part 22 judges whether any of the on-air TV programs has ended and broadcasting of another TV program has started (S302).

In the case where any of the on-air TV programs has ended and broadcasting of another TV program has started (S302: Yes), the TV program acquisition part 22 carries out the processing shown in the step S300 again. In the case where no on-air TV program has ended (S302: No), the recommendation information providing part 23 judges whether a recommendation request has been received from an STB 30 through the communication line 14 (S303).

In the case where a recommendation request has not been received from an STB 30 (S303: No), the TV program acquisition part 22 carries out the processing shown in the step S302 again. In the case where a recommendation request has been received from an STB 30 (S303: Yes), the recommendation information providing part 23 sends the retained recommendation information to the STB 30 (S304), and the TV program acquisition part 22 carries out the processing shown in the step S302 again.

Hereinabove, the fourth embodiment of the present invention has been described.

The content recommendation apparatus 20 in each of the above-described embodiments can be implemented by a computer 70 having the configuration shown in FIG. 14, for example. The computer 70 comprises a Central Processing Unit (CPU) 71, a Random Access Memory (RAM) 72, a Read Only Memory (ROM) 73, a Hard Disk Drive (HDD) 74, a communication interface (I/F) 75, an input-output interface (I/F) 76, and a media interface (I/F) 77.

The CPU 71 operates on the basis of a program stored in the ROM 73 or the HDD 74, and controls various parts. The ROM 73 stores a boot program that is executed by the CPU 71 at the time of activation of the computer 70, programs that are dependent on the hardware of the computer 70, and so on.

The HDD 74 stores programs executed by the CPU 71 and data used by those programs. The communication interface 75 receives data from other devices through the communication line 14 and sends the received data to the CPU 71. Further, the communication interface 75 sends data generated by the CPU 71 to other devices through the communication line 14.

The CPU 71 controls output devices such as a monitor and input devices such as a keyboard, a mouse and the like through the input-output interface 76. The CPU 71 acquires data from the input devices through the input-output interface 76. Further, the CPU 71 outputs generated data to the output devices through the input-output interface 76.

The media interface 77 reads a program or data stored in a storage medium 78 and provides the read data to the CPU 71 through the RAM 72. The CPU 71 loads the program in question from the storage medium 78 into the RAM 72 through the media interface 77, and executes the loaded program. The storage medium 78 is an optical record medium such as a Digital Versatile Disk (DVD) or a Phase change rewritable Disk (PD), a magneto-optical record medium such as Magneto-Optical disk (MO), a tape medium, a magnetic recording medium, a semiconductor memory, or the like.

In the case where the computer 70 functions as the content recommendation apparatus 20 in the first or second embodiment, the CPU 71 of the computer 70 realizes respective functions of the reception part 21, the TV program acquisition part 22, the recommendation information providing part 23, the similarity calculation part 24, the recommendation rank correction part 25 and the content information storage part 26 by executing programs loaded into the RAM 72. Further, the ROM 73 or the HDD 74 stores data in the content information storage part 26.

In the case where the computer functions as the content recommendation apparatus 20 in the third embodiment, the CPU 71 of the computer 70 realizes respective functions of the TV program acquisition part 22, the recommendation information providing part 23, the similarity calculation part 24, the recommendation rank correction part 25, the content information storage part 26 and the timer 27 by executing programs loaded into the RAM 72. Further, the ROM 73 or the HDD 74 stores data in the content information storage part 26.

Further, in the case where the computer 70 functions as the content recommendation apparatus 20 in the fourth embodiment, the CPU 71 of the computer 70 realizes respective functions of the TV program acquisition part 22, the recommendation information providing part 23, the similarity calculation part 24, the recommendation rank correction part 25, the content information storage part 26 and the clock 28 by executing programs loaded into the RAM 72. Further, the ROM 73 or the HDD 74 stores data in the content information storage part 26.

The computer 70 reads these programs from the storage medium 78 and executes them. As another example, these programs may be acquired from other devices through a communication medium. Here, the communication medium part the communication line 14, or a digital signal or a carrier wave that propagates through the communication line 14.

Further, the present invention is not limited to the above-described embodiments, and can be varied variously within the gist of the invention.

For example, in each of the above embodiments, a preliminary rank set for each VOD content is set by a business entity that provides VOD contents, depending on the situation such as popular topics of the time and release of new movies. As another mode, a preliminary rank may be generated on the basis of a viewing history or recording history of each user or previously-registered taste information for each user, according to a method such as one described in Patent Document 1.

Further, each of the above-described embodiments assumes that the viewing environment of each user is same. As another mode, it is possible that the content recommendation apparatus 20 previously registers types of media usable to each user, and the content recommendation apparatus 20 lowers the recommendation rank of a VOD content having higher degree of similarity to programs broadcast in real time within the range of media that can be viewed by each user.

As another mode, it is possible that the content recommendation apparatus 20 raises the recommendation rank of a VOD content highly-related to TV programs acquired from EPG or the like as TV programs scheduled to be broadcast in the future. From the currently-used EPG, meta data up for 9 days can be acquired. By using this information, the content recommendation apparatus 20 can recommend VOD contents having higher degrees of similarity to TV programs that will be broadcast within 9 days henceforth on any of all channels.

In that case, when it is scheduled to broadcast the second work of a movie on terrestrial broadcasting, the content recommendation apparatus 20 can recommend the first work of the same series. In particular, it is considered that such recommendation is important for a series of works. Thus, for example, by judging the degree of similarity by weighting a title and the ordinal number of a work in a series, it is possible to recommend TV programs that meet the taste of a viewer much more.

In detail, the content recommendation apparatus 20 extracts VOD contents each having the same title as a TV program broadcast up for 9 days in any of all channels. Then, for each of the extracted VOD contents, the content recommendation apparatus 20 calculates a difference obtained by subtracting the ordinal number of the VOD content in question in the series from the ordinal number of a program in the same series that will be broadcast in other media.

For example, in the case where the third work of a series of movies is scheduled to be broadcast on terrestrial broadcasting, the difference of ordinal number for a VOD content of the first work of the same series is calculated as 3−1=2. If the difference of ordinal number is 0 or minus, the VOD content in question is removed from objects of change of recommendation rank.

Then, the content recommendation apparatus 20 calculates the rank change quantity by using the following equation (2).

$$\text{Rank change quantity} = m - \text{Difference of ordinal number} \quad (2)$$

Here, m is a constant (for example, 100).

Then, the content recommendation apparatus 20 raises the preliminary rank by the calculated rank change quantity. As a result, the content recommendation apparatus 20 can raise the recommendation rank of a VOD content of a previous work in a same series.

In the case where EPG includes meta data of TV programs more than 9 days after, the content recommendation apparatus 20 may raise the recommendation rank of a VOD content highly-related to TV programs acquired from the EPG as TV programs scheduled to be broadcast more than 9 days after.

The invention claimed is:

1. A content recommendation apparatus that recommends to a user VOD contents distributed under a Video On Demand (VOD) system, comprising:

a content information storage unit, which stores meta data of each VOD content and a preliminary rank which indicates a preliminary recommendation rank assigned previously to that VOD content;

a TV program acquisition unit, which acquires meta data of each TV program that is broadcast at a given point of time;

a similarity calculation unit, which calculates a degree of similarity of each VOD content to TV programs broadcast at a given point of time by referring to the content information storage unit when the meta data concerned is acquired by the TV program acquisition unit;

a recommendation rank correction unit, which calculates a rank change quantity of each VOD content on basis of the degree of similarity calculated by the similarity calculation unit, the rank change quantity becoming a larger value as the degree of similarity becomes higher, to correct the preliminary rank of each VOD content by lowering the preliminary rank by the calculated rank change quantity; and a recommendation information providing unit, which provides recommendation information that includes the corrected preliminary ranks to the user.

2. A content recommendation apparatus of claim 1, wherein: the similarity calculation unit calculates the degree of similarity as a ratio of a number of items having coincident contents to a total number of items between the items in the meta data acquired by the TV program acquisition unit and the items in the meta data of each VOD content in the content information storage unit.

3. A content recommendation apparatus of claim 1, wherein: the content recommendation apparatus further comprises a reception unit, which receives designation of a time from a user; and the TV program acquisition unit acquires the meta data of TV programs that are broadcast at the time whose designation is received by the reception unit from the user.

4. A content recommendation apparatus of claim 1, wherein: the TV program acquisition unit acquires at intervals of a predetermined time the meta data of TV programs that are broadcast at each point of time of acquisition.

5. A content recommendation apparatus of claim 1, wherein: the TV program acquisition unit judges whether an on-air TV program has ended and broadcasting of another TV program has started, on a basis of last-acquired meta data of TV program; and in a case where an on-air TV program has ended and broadcasting of another TV program has started, the TV program acquisition unit acquires the meta data of TV programs that are currently broadcast.

6. A content recommendation apparatus of claim 3, wherein: the TV program acquisition unit acquires the meta data of TV programs that are broadcast within a predetermined time from the time whose designation is received by the reception unit from the user.

7. A content recommendation apparatus of claim 4, wherein: the TV program acquisition unit acquires at intervals of a predetermined time the meta data of TV programs that are broadcast within a predetermined time ahead from each point of time of acquisition.

8. A content recommendation apparatus of claim 5, wherein:

the TV program acquisition unit judges whether an on-air TV program has ended and broadcasting of another TV program has started, on a basis of last-acquired meta data of TV program; and in a case where an on-air TV program has ended and broadcasting of another TV program has started, the TV program acquisition unit acquires the meta data of TV programs that are broadcast within a predetermined time ahead from a current time.

9. A content recommendation method for a content recommendation apparatus that recommends to a user VOD contents distributed under a Video On Demand (VOD) system, wherein: the content recommendation apparatus performs:

a TV program acquisition step, in which meta data of each TV program that is broadcast at a given point of time is acquired;

a similarity calculation step, in which, when the meta data of TV program is acquired in the TV program acquisition step, a degree of similarity of each VOD content to TV programs broadcast at a given point of time is calculated by referring to a content information storage unit that stores the meta data of the VOD content and a preliminary rank which indicates a preliminary recommendation rank assigned to the VOD content;

a recommendation rank correction step, in which a rank change quantity of each VOD content is calculated on a basis of the degree of similarity calculated in the similarity calculation step, the rank change quantity becoming a larger value as the degree of similarity becomes higher, and the preliminary rank of each VOD content is corrected by lowering the preliminary rank by the calculated rank change quantity; and a recommendation information providing step, in which recommendation information that includes the corrected preliminary ranks is provided to the user.

* * * * *